(12) United States Patent
Krishna et al.

(10) Patent No.: US 8,713,644 B2
(45) Date of Patent: Apr. 29, 2014

(54) SYSTEM AND METHOD FOR PROVIDING SECURITY IN BROWSER-BASED ACCESS TO SMART CARDS

(75) Inventors: Ksheerabdhi Krishna, Aix-en-Provence (FR); Kapil Sachdeva, Leander, TX (US); HongQian Karen Lu, Austin, TX (US)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/255,106

(22) PCT Filed: Mar. 5, 2010

(86) PCT No.: PCT/EP2010/052843
§ 371 (c)(1),
(2), (4) Date: Sep. 6, 2011

(87) PCT Pub. No.: WO2010/100262
PCT Pub. Date: Sep. 10, 2010

(65) Prior Publication Data
US 2011/0320818 A1    Dec. 29, 2011

Related U.S. Application Data

(60) Provisional application No. 61/158,192, filed on Mar. 6, 2009.

(51) Int. Cl.
*H04L 9/32* (2006.01)
*G06F 21/00* (2013.01)

(52) U.S. Cl.
USPC .......................................................... 726/4

(58) Field of Classification Search
USPC .......................................................... 726/4
See application file for complete search history.

(56) References Cited

U.S. PATENT DOCUMENTS 7,748,609 B2     7/2010   Sachdeva et al.
2009/0064301 A1*  3/2009   Sachdeva et al. ................. 726/9

FOREIGN PATENT DOCUMENTS

EP          1626324 A2     2/2006

OTHER PUBLICATIONS

Tomimori H. et al: "An efficient and flexible access control framework for Java programs in mobile terminals" Proceedings of the 22nd Inter National Conference on Distributed Computing Systems Workshops, Jul. 2, 2002. Piscataway, NJ USA, IEEE, pp. 777-782, XP010601614 ISBN: 978-0-7695-1588-8 sections 3,4.
PCT/EP2010/052843, International Search Report, Dec. 10, 2010, European Patent Office, P.B. 5818 Patentlaan 2 NL—2280 HV Rijswijk.
PCT/EP2010/052843, Written Opinion of the International Searching Authority, Dec. 10, 2010, European Patent Office, P.B. 5818 Patentlaan 2 NL—2280 HV Rijswijk.

* cited by examiner

*Primary Examiner* — Gilberto Barron, Jr.
*Assistant Examiner* — Devin Almeida
(74) *Attorney, Agent, or Firm* — The Jansson Firm; Pehr B. Jansson (57) ABSTRACT

A method of operating a host computer having a web-browser with the capability of executing at least one web-browser add-on to provide a web application access to a smart card to protect the smart card from security threats associated with being connected to the Internet. Prior to establishing a connection between a web application executing in the web browser, verifying that the web application has been authorized to connect to a smart care using the web-browser add-on to provide a web application access to a smart card.

18 Claims, 5 Drawing Sheets

SYSTEM AND METHOD FOR PROVIDING SECURITY IN BROWSER-BASED ACCESS TO SMART CARDS

BACKGROUND OF THE INVENTION

The present invention relates generally to application program access to smart cards, and more particularly to a system and method for ensuring information security when allowing applications executing in a web-browser to access the functions and data stored on a smart card.

A smart card is a small secure personal computer that lacks input and output devices. Typical applications for smart cards include user authentication, storing private data, and use as electronic purses. For these applications, as well as for others, the usual mode of interacting with the smart card is from a host application that is executing on a host computer to which the smart card is connected.

U.S. patent application Ser. No. 11/849,117, Kapil Sachdeva and Ksheerabdhi Krishna, "System and Method for Browser Based Access to Smart Cards," filed on 31 Aug. 2007, describes a mechanism which removes many burdens on a programmer in creating web-applications that access smart cards. In one scenario, for example, using the SConnect technology from Gemalto, Inc., Austin, Tex., USA, a web-application may be downloaded onto the host computer when a user accesses a remote web service. The web-application may be written an application program interface that is common across browsers and platforms. To insulate the web-application developer from the intricacies of particular platforms and browsers, a browser extension (herein referred to as the smart card access browser extension) is loaded into the browser. That browser extension marshals the interaction between the web-applications and the smart card. Thus, the browser extension provides a data pipe from the remote web-service to the smart card via the web-application. The SConnect technology from Gemalto, Inc., Austin, Tex. is an example of a smart card access browser extension.

Smart cards are often used to store highly sensitive information. For example, smart cards may be used for cryptographic operations and then would hold a user's private key. Smart cards may also be used to hold credentials for accessing various types of accounts, e.g., to provide access to particular computers or networks, financial accounts, health information accounts. Naturally, it is very important to safeguard such information and services provided by smart cards from inadvertent disclosure to third parties, from intentional theft by third parties, and from inadvertent or intentional damage. Failure to provide such safeguards could lead to unauthorized access to the information of the holder of a smart card, unauthorized access to a user's online accounts, destruction of data, and other types of identity theft.

A smart card access browser extension provides a mechanism by which a remote web-service is connected to the smart card over the Internet via a local computer. It is therefore desirable to use the smart card access browser extension to counter potential security threats to which a smart card is exposed when connected to the Internet.

Some examples of possible attacks against a smart card include Phishing, DNS Cache Poisoning, Malicious Websites, and Man-in-the-Middle Attacks.

Phishing attacks trick users into divulging their login credentials to malicious websites that resemble legitimate websites that a user may want to access, e.g., by pretending to be the user's bank or another online merchant with which a user may have an account. The key to prevent Phishing is the user's vigilance.

DNS cache poisoning attacks exploit vulnerabilities of DNS servers and trick the servers to accept fraudulent information that directs traffic to malicious websites. While Phishing lure individual victims, DNS cache poisoning can redirect all users trying to reach a target website to a fraudulent one.

Malicious Websites. Traditional smart cards work on an assumption that the host computer is secure. If a user enters a valid PIN, a client program on the host computer can access the smart card. In fact, any programs on the computer can access the card after the user logs in. Global Platform's Secure Channel Protocols (SCP) and ISO 7816-4's Secure Messaging prevent this problem by establishing authenticated secure communication channel between one client application on the host computer and one sever application in the smart card. Unfortunately, many smart cards in the field were either issued before these security standards were put in place or have not implemented them. These cards are vulnerable to attacks by malicious software on the computers.

The Man-In-The-Middle (MITM, middleperson) is an infamous network attack. The attacker pretends to be the server to a client, and pretends to be a client to the server, intercepting messages in between. For an example, assume a user wants to access a remote server using a client application (a browser, for example). The middleperson is located in between the client and the server intercepting the user's private data, modifying transactions, and/or hijacking the authenticated channel.

The secure socket layer (SSL), or its later version the transport layer security (TLS) protocol, enables two connecting Internet parties (e.g., a client and a server) to securely communicate, preventing MITM to eavesdrop or modify messages sent between the two parties. To completely prevent MITM attacks, the two communicating parties must know and authenticate each other. This, however, is often not the case; client authentication is often not used.

The HTTPS is HTTP carried by SSL/TLS instead of directly by TCP. It enables secure communication between web applications.

In addition to Internet based attacks, the smart card could be vulnerable to attacks launched from the host computer. One such attack mechanism is the Keystroke Logger. A keystroke logger is a malicious software program that captures a user's keystrokes with the motive to steal user's login credentials, such as usernames and passwords. The logger can then send the captured keystrokes to a remote server to extract information and to use it for fraudulent activities. Simple keystroke loggers are less effective with smart cards because captured PIN is no use without corresponding smart cards. A sophisticated keystroke logger can, however, capture a user PIN, wait for the subsequent smart card insertions, and access the card without the card holder's knowledge.

Other vulnerabilities to smart card data security derive from user behavior. While many software programs present warning messages to users, it is not uncommon for users to ignore such warnings.

Similarly, while many interactions between a client web browser and a remote web server is secured using SSL or TLS, such secure communication between client and server requires that the server is in possession of a valid and trustworthy SSL certificate. To be valid and trustworthy, the SSL certificate must be signed by a trusted root certificate authority (CA) and there must be a match between the Common Name (CN) of the certificate and the URL of the web page being accessed. If the SSL certificate does not meet those requirements, the web browser warns the user. It is very common for users to simply ignore such warnings and proceed with establishing the session with the remote server in spite of the SSL certificate not being valid. That poses the risk to the user that a malicious web site is being accessed which may cause improper access or manipulation of the contents of the user's smart card.

Therefore, it is desirable to provide security mechanisms by which the interaction by remote web-services to a smart card via the smart card access browser extension is safeguarded against malicious attackers and unintentional damages.

From the foregoing, it is be apparent that there is a need for an improved method to provide web applications access to smart cards.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a web-browser extension provides an interface between web-browser applications and the smart card resource manager (PC/SC) found in most computers. The web-browser extension insulates the web-browser applications from the smart card resource manager. Furthermore, the smart card access web-browser extension, via the smart card resource manager, provides for a communications pipe between a web-browser application and a smart card connected to the host computer on which the web-browser containing the web-browser extension allowing web applications access to the smart cards is executing. The interaction between the web-browser applications and the smart card is secured using mechanisms for ensuring that only authorized web applications are provided access to the contents of the smart card via the smart card access web-browser extension.

Figure 1:
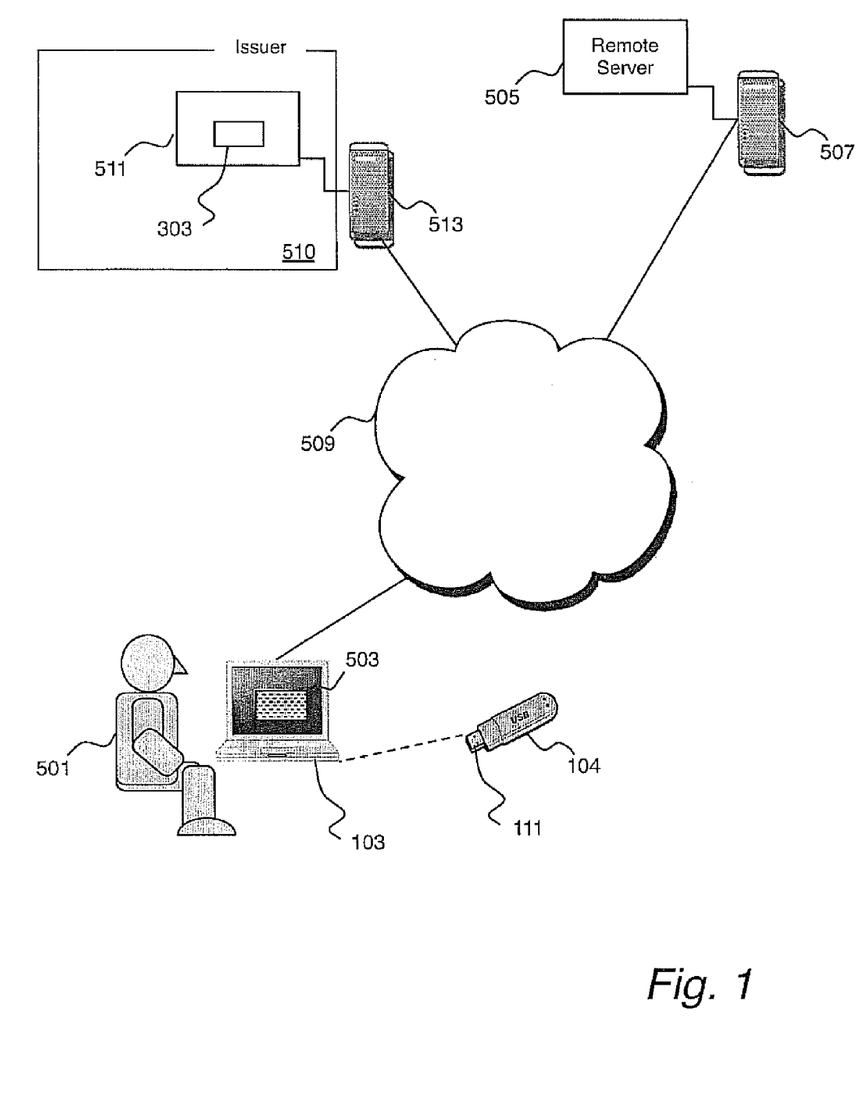
FIG. 1 is a schematic illustration of a network in which a user may be attempting to access a remote web service.

FIG. 1 is a schematic illustration of a network in which a user 501 may be attempting to access a web server. The user 501 is operating a web-browser displaying a window 503 on a host computer 103. The user wishes to interact with a remote web server 505 executing on a remote computer system 507 perhaps for performing some form of online transaction over a network 509. To secure the transaction, the user 501 uses a smart card 104 connected to the host computer 103 via an interface device 111. The smart card 104 may also contain other user data such as account information or personal information regarding the user 501. In many cases the smart card 104 may be called upon to perform cryptographic functions.

Figure 2:
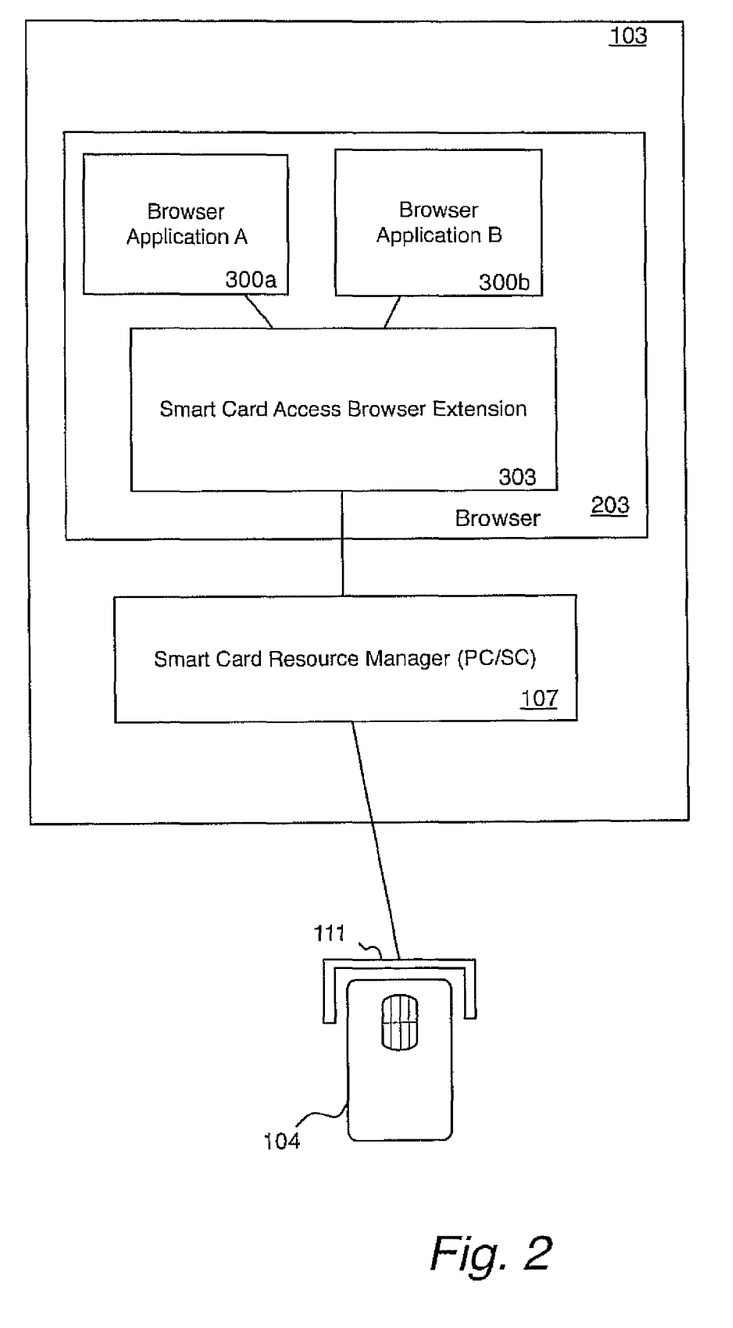
FIG. 2 is a block diagram illustrating an embodiment in which web-browser applications interact with a smart card and wherein the interaction between the web browser application and the smart card is via a smart card access browser extension.

FIG. 2 is a block diagram illustrating an embodiment in which a web-browser applications A 300a and B 300b interact with a smart card 104 through the smart card access browser extension 303. As is described in the co-pending U.S. patent application Ser. No. 11/849,117, the smart card access browser extension 303 may be divided in several components, e.g., to divide browser and platform specific aspects from common application program interface aspects. However, herein, for the sake of simplification of the description, the smart card access browser extension 303 is described as one module.

The smart card access browser extension 303 communicates with the smart card 104 via the smart card resource manager 107.

The smart card access browser extension 303 may be pre-installed in the browser 203. If not, the smart card access browser extension 303 would be downloaded from the issuer 510 from a server 511 running on a remote server system 513.

Figure 3:
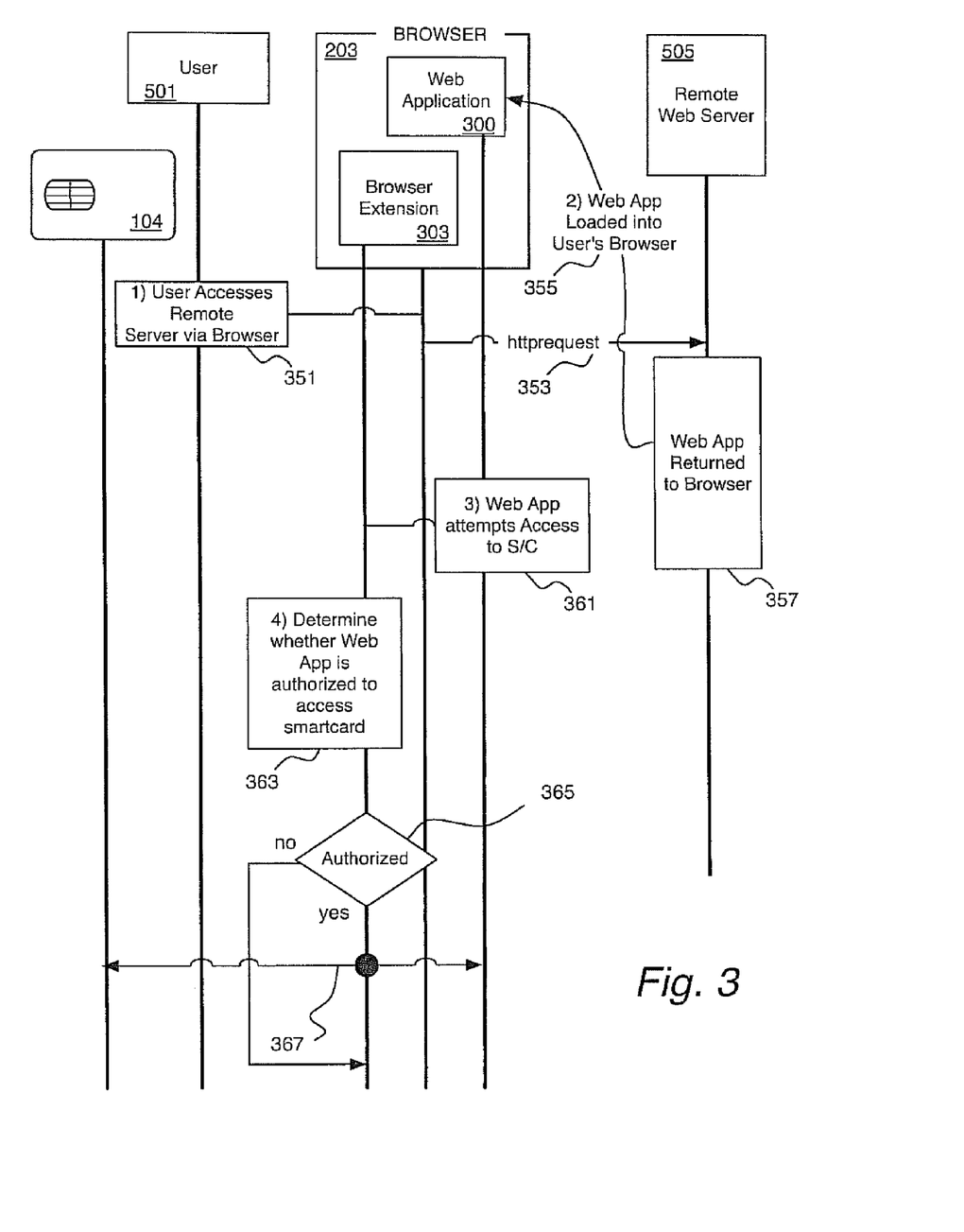
FIG. 3 is a timing sequence diagram illustrating the message flow between a remote web server and a browser to allow a web application loaded from the web server to access a smart card connected to the host computer on which the browser is located while maintaining security for the data stored on the smart card.

FIG. 3 is a timing sequence diagram illustrating the message flow between a remote web server 505 and a browser 203 to allow a web application 300 loaded from the web server 505 to access a smart card 104 connected to the host computer 103 on which the browser 203 is located while maintaining security for the data stored on the smart card 104 and for the user account on the remote web server. In the example of FIG. 3, it is presumed that the smart card access browser extension 303 has already been installed into the browser 203.

Figure 4:
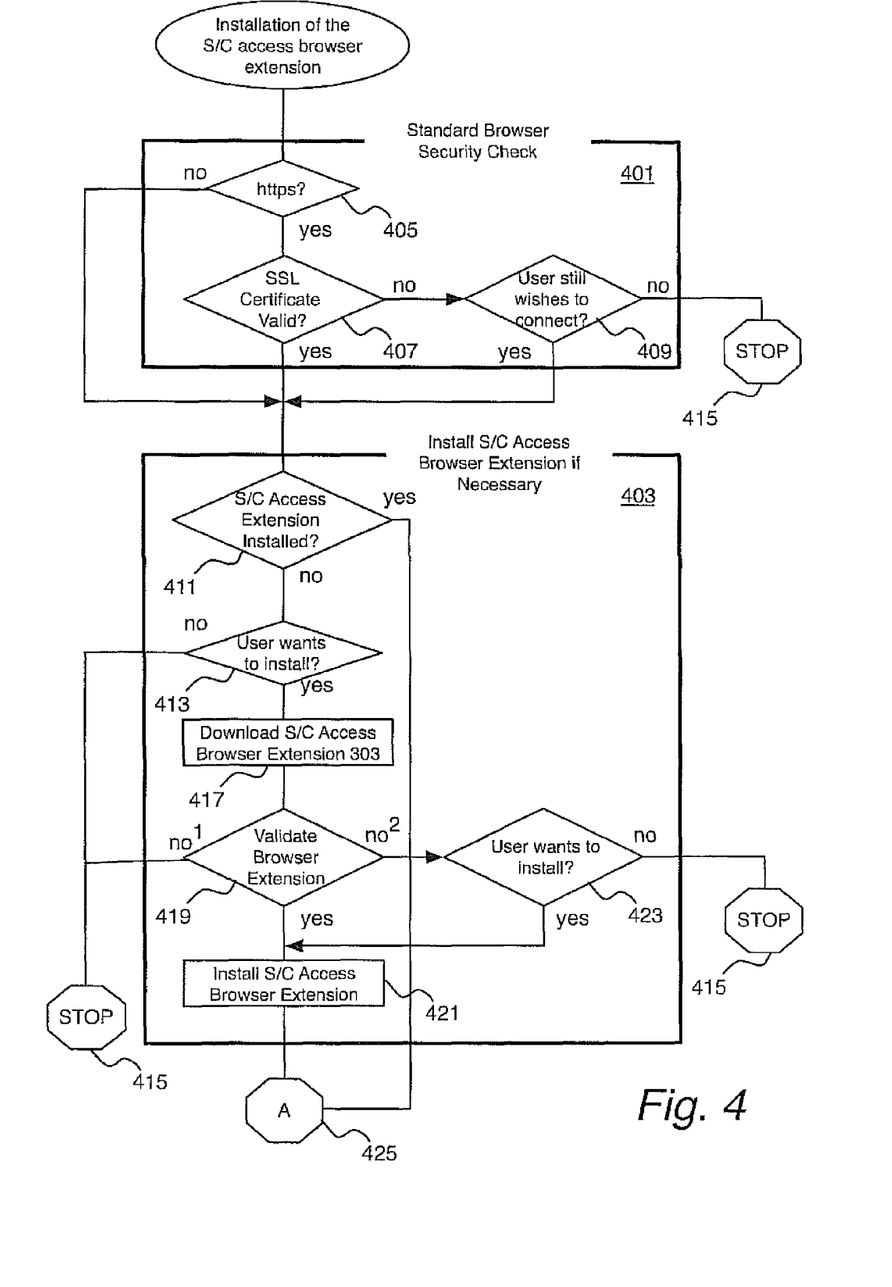
FIG. 4 is a flow-chart illustrating the operations of the browser to securely download and install the smart card access browser extension.

FIG. 4 is a flow-chart illustrating the installation of the smart card access browser extension 303.

A user 501 starts the interaction by indicating to the browser 203 that the user desires to access a web page or to interact in some fashion with a webpage on the remote server 505, step 351. In response to the user's request, the browser 203 issues an http request message onto the remote web server 505, step 353. For the scenario contemplated herein, a web application is loaded into the browser 203. Thus, the web server 505 responds to the http request 353 with a message 355 containing the web application 300, step 355. If the web application has already been loaded into the browser 203, the step of downloading it from the remote web server 505 and installation on the browser 203 is not necessary.

Next, the web application 300 attempts to access the smart card 104, step 361. All interactions with the smart card 104 are marshaled by the smart card access browser extension 303. If the smart card access browser extension 303 is not present, it is downloaded from the issuer 510. The downloading and installation of the smart card access browser extension 303 is described in greater detail below in conjunction with FIG. 4.

As a security precaution, prior to allowing the web application 300 access to the smart card, the smart card access browser extension 303 determines whether the web application 300 has been authorized to access smart cards through the smart card access browser extension 303, step 363. The process of determining whether a web application 300 has been authorized to access smart cards through the smart card access browser extension 303 is described in greater detail in conjunction with FIG. 5.

If the web application 300 is authorized (as determined by the process of FIG. 5), decision box 365, a connection between the smart card 104 and the web application 300 via the smart card access browser extension 303 is established, step 367. Otherwise, the connection between the smart card access browser extension 303 and the smart card 104 is rejected.

Turning now to FIG. 4 which is a flow-chart illustrating the operations of the browser to securely download and install the smart card access browser extension. The installation of the smart card access browser extension 303 has two major portions: a standard browser security check 401 performed as standard operating procedure by browsers when accessing web pages using the https protocol, and an process 403 for installing the smart card access browser extension 303. The standard browser security check 401 starts by determining if the connection to the remote server 505 is over a secure communications protocol, e.g., https, step 405. If not, the process proceeds with the checks and installation of the smart card access browser extension install process 403.

If yes, the validity of the SSL certificate is determined step 407. Validity of the SSL certificate requires a match between the common name listed in the SSL certificate and the URL of the web page being accessed, that the certificate has been signed by a trusted root certificate authority, and that the certificate has not expired. If the SSL certificate is valid, the process proceeds with the smart card access browser extension installation process 403. Otherwise, the user is queried to determine whether to proceed with the installation or not, step 409, and if so (yes), the process proceeds with the smart card access browser extension installation process 403. Otherwise, the process stops, step 415, and the smart card access browser extension 303 is not installed thus preventing any access to the smart card 104.

The smart card access browser extension installation process 403 commences with checking to determine if the smart card access browser extension 303 has already been installed, step 411. If yes, the smart card access browser extension 303 may be used to allow authorized web applications 300 access to the smart card 104 (the process illustrated in and discussed in conjunction with FIG. 5). Otherwise, the process proceeds by asking the user whether to install the smart card access browser extension 303, step 413, e.g., whether the user wishes to enable the browser 203 to provide the functionality of providing web applications 300 access to smart cards connected to the host computer 103. If no, the process is stopped, 415. If yes, the smart card access browser extension 303 is downloaded from the issuer 510, step 417.

When the smart card access browser extension 303 has been downloaded its validity is verified, step 419. The smart card access browser extension 303, if valid, should be signed by the issuer using the private key of the issuer. The SSL certificate containing the corresponding public key is signed by a trusted root certificate authority, e.g., Verisign. Thus, the browser 203 may validate the smart card access browser extension 303 by confirming that the smart card access browser extension 303 has been signed by the issuer 510 and that the SSL certificate for the smart card access browser extension 303 has been signed by a trusted root certificate authority. If the validity of the smart card access browser extension 303 is confirmed (yes), the smart card access browser extension 303 is installed into the browser 203, step 421.

There are two alternative embodiments for the validation failure. First, the installation may simply be rejected ($NO^1$) and the installation process 403 is terminated, 415. In the second alternative ($NO^2$), the user is asked as to whether to proceed with the installation, step 423. In that alternative, if the user accepts the installation in spite of the validation failure the installation proceeds, step 421. Otherwise, the process is terminated without installing the smart card access browser extension 303, step 415.

Once the smart card access browser extension 303 has been installed, the smart card access browser extension 303 may be used by authorized web applications to access smart cards 104, step 425. The process of verifying that web applications have been authorized for using the smart card access browser extension 303 to access smart cards is described in greater detail in conjunction with FIG. 5.

Figure 5:
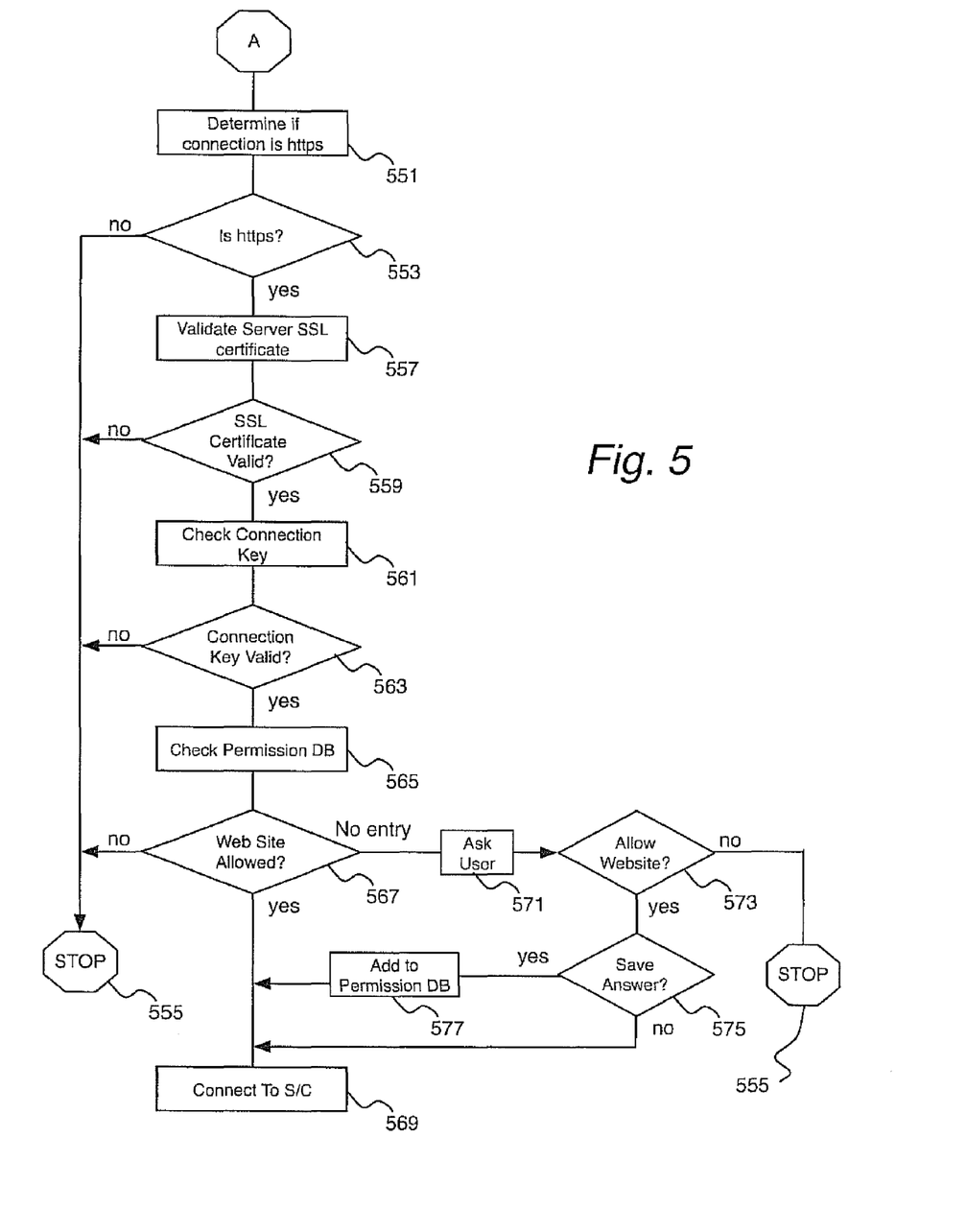
FIG. 5 is a flow-chart illustrating the operations of the smart card access browser extension to secure the access of web applications to the smart card connected to the host computer on which the browser is executing.

FIG. 5 is a flow-chart illustrating the operations of the smart card access browser extension 303 to secure the access of web applications 300 to the smart card 104 connected to the host computer 104 on which the browser 300 is executing.

To ensure secure communication with the remote web server 505 and to make MITM attacks harder to achieve, the smart card access browser extension 303 only allows secure connections, e.g., https connections between a web browser and a remote web server wherein the https connection is secured with a valid certificate. If a user has ignored a warning message to proceed in spite of the certificate being invalid, the process of FIG. 5 overrides that decision by the user and does not permit the connection between the web application 300 and the smart card 104 even if the user had previously allowed a connection between the browser 203 and the remote server 505 secured using an invalid certificate. In the SSL-specific embodiment, in this way, to achieve MITM, the malicious website must have a valid SSL certificate. While it may be possible for a malicious website to have obtained an SSL certificate, to further protect the contents of the smart card 104 and the user's account at the remote server from a MITM attack, the smart card access browser extension 303 employs two other mechanisms, connection key and server validation, discussed in greater detail below. However, an initial step is determined whether the connection to the remote web server 505 is secured using a secure protocol, e.g., https, step 551. If the connection is not https, decision box 553, the web application 300 is not allowed access to the smart card 104, and the process is terminated, step 555. Otherwise, the smart card access browser extension 303 proceeds with validating the SSL certificate of the remote server 505, step 557.

If the certificate, e.g., the SSL certificate in the https-specific embodiment, securing the communications channel to the remote server is not valid, decision box 559, the web application 300 is not allowed to access the smart card 104, and the process is terminated, step 555. Otherwise (yes), a connection key is checked to determine whether the web application 300 has been authorized by the issuer 510 to access smart cards 104 through via the smart card access browser extension 303, step 561.

To further ensure only legitimate websites, e.g., web sites that have been vetted by the issuer 510 as unlikely to be a malicious operator, can use the smart card access browser extension 303 to access smart cards 104, the issuer issues connection keys to websites that the issuer believes to be legitimate. For example, if the smart card access browser extension 303 is the SConnect technology from Gemalto, Inc., Austin, Tex., USA, only websites approved by Gemalto is allowed to access smart cards via the SConnect. The connection key is signed by a private key $K_{priv}$ of the issuer. The corresponding public key of the issuer, $K_{pub}$, is encoded into the smart card access browser extension 303. The connection key does not contain any secret. The connection key includes the following items:
 1. The organization name;
 2. Common Name, which is the website's domain name;
 3. Issuer name, e.g., Gemalto;
 4. Issue date and expiration date of the connection key;
 5. Signature, which is the digital signature of the above material signed by issuer.
 6. The fingerprint of the website's SSL certificate.

When establishing a session in which a web application 300 is to connect to a smart card 104, a website must present to the smart card access browser extension 303 the connection key of the website. The smart card access browser extension 303 validates the connection key by checking the following items in the connection key, step 561:
 1. The Common Name must match the website's domain name (origin of the requester's domain name);
 2. The expiration date must be at or beyond the current date;
 3. The signature must pass verification using the issuer public key $K_{pub}$.
 4. The fingerprint must match that of the website's SSL certificate.

The smart card access browser extension 303 allows the connection from the website to the smart card only if the validation of the connection key is successful, decision box 563. Otherwise, the connection request is denied.

In one embodiment a revocation mechanism is implement to revoke a connection key granted to an operator. That may be accomplished using the OCSP (Online Certificate Status Protocol). In an alternative embodiment, the connection key is set to expire after a specified period. A website 505 must renew its connection key when the key is to be expired.

If the connection key is determined to not be valid, decision box 563, the process is terminated, step 555, without creating a connection between the web application 300 and the smart card 104 via the smart card access browser extension 303.

In an alternative embodiment, the Connection Key by itself is not considered sufficient to authenticate a remote server. It is mainly an authorization tool to give permission for a website to use smart card access browser extension 303. The SSL handshaking performed between the web server and the web browser, server validation performed by the smart card access browser extension 303 (described herein below), and the Connection Key validation together provides server authentication and authorization.

Thus, if the connection key is determined valid, decision box 563, the next step is to determine whether the web site has been determined as one that the user has allowed to access smart cards 104 via the smart card access browser extension 303, step 565. Allowed sites are maintained in a white list in a permission database which also holds a black list of sites that are not allowed to access smart cards via the smart card access browser extension 303. If the web site is in the white list (containing allowed web sites), decision box 567 (yes), the connection 367 (FIG. 3) is established, step 569.

If not, the user is asked, step 571, whether to allow the web site, and if so, decision box 573, whether to save the answer in the permission db, decision box 575. If the user wishes to allow the website access to the smart card and added to the permission data base, the website is added to the white list of the permission database, step 577. Conversely, if the user wishes to not allow the web site access, the web site may be added to the black list of the permission database (For the sake of simplifying the drawing this not explicitly illustrated. However, the mechanism is similar to adding an allowed web site to the white list).

If the user does not wish to allow the website determined to not be permitted per the permission database, decision box 573, the process is terminated 555, without establishing a connection between the web application 300 and the smart card 104.

From the foregoing it will be apparent that the technology described herein provides an efficient mechanism for seamlessly employing smart cards in the context of web applications. These mechanisms provide a heightened level of security to ensure that only authorized web applications that have been validated may have access to smart cards via the smart card access browser extension that marshals interaction between web applications and smart cards on a host computer. Through the aforementioned mechanisms the risks of exposure to attacks such as man-in-the-middle, DNS Cache poisoning, phishing, etc. are minimized.

Although specific embodiments of the invention have been described and illustrated, the invention is not to be limited to the specific forms or arrangements of parts so described and illustrated. The invention is limited only by the claims.

We claim:

1. A method for providing a secure connection between a web server application originating on a web server having a website domain name and a security device connected to the web server over a network via a host computer, comprising
 establishing a connection to the web server over a computer network;
 loading a web server application from the web server into the browser;
 executing a browser extension for providing the web server application access to the security device subject to confirm that the web server application may access the security device, the confirming that the web server application may access the security comprises:
  authenticating the web server by verifying that the connection is a secure connection established using a digital certificate issued by a trusted root certificate authority;
  receiving from the web server a connection key issued by an authorizing organization wherein the connection key is cryptographically linked to the authorizing organization, cryptographically linked to a digital certificate of the web server;
  determining whether the connection key presented by the web server is valid and that the connection key is indicative of that the web server application has been properly authorized to access the security device by the authorizing organization;
  if the connection key is valid and indicative of that the webserver application has been properly authorized to access the security device by the authorizing organization, allowing the web server application to connect to the security device;
  and
  if the connection key is not valid or is not indicative of that the webserver application has been properly authorized to access the security device by the authorizing organization, denying the web server application the opportunity to connect to the security device.

2. The method for providing a secure connection of claim 1 wherein the security device is a smart card.

3. The method for providing a secure connection of claim 2 wherein the security device is a SIM card.

4. The method for providing a secure connection of claim 1 wherein the security device is selected from a security token, a biometric device, a mobile phone.

5. The method for providing a secure connection of claim 1 wherein a connection key has a common name associated therewith and wherein determining whether the connection key is valid comprises comparing the common name to the website domain name.

6. The method for providing a secure connection of claim 1 wherein a connection key has an expiration date associated therewith and wherein determining whether the connection key is valid comprises determining if the expiration date is prior to current calendar date.

7. The method for providing a secure connection of claim 1 wherein a connection key is issued by an issuing organization and has a digital signature and wherein determining whether the connection key is valid comprises verifying the digital signature using a public key of the issuing organization.

8. The method for providing a secure connection of claim 1 wherein a connection key contains a fingerprint of the SSL certificate of the remote server website and wherein determining whether the connection key is valid comprises verifying the fingerprint.

9. The method for providing a secure connection of claim 1 further comprises
creating a permissions database having a list of allowed websites;
if the website domain name is on the list of allowed websites, allowing the web server application to connect to the security; and
if the website domain name is not on the list of allowed websites, querying the user as to whether the user permits the web server application to connect to the smart card and allowing the web server application to connect to the smart card if the user indicates permission of the user to the web server application accessing the security.

10. The method for providing a secure connection of claim 1 further comprising
wherein connecting to the web server using a browser executing on the host computer comprises establishing a secure communications channel between a user browser and a remote website;
determining whether the secure communications channel has been established using a valid certificate for establishing secure communications channels; and
denying the connection from the web server application to the security if the certificate used to establish the secure communications channel is not valid.

11. The method for providing a secure connection of claim 1 wherein the secure connection is an SSL connection and the connection certificate is an SSL certificate.

12. The method for providing a secure connection of claim 10 wherein determining whether a valid certificate was used to establish the secure communications
channel comprises determining whether a common name in the certificate matches with the domain name of the web server, whether the certificate used to establish the secure communications channel has not expired, and whether the certificate to establish the secure communications channel has been issued by a trusted certificate authority.

13. The method for providing a secure connection of claim 1 further comprising prior to allowing the web server application to connect to the security device, determining that the connection between the web browser and the remote server is secured by a valid certificate.

14. A non-transitory computer readable storage medium for containing computer executable instructions for a host computer with a central processing unit, a memory, and a storage medium for storing instructions loadable into the memory and executable by the central processing unit, the storage medium including instructions for causing the central processing unit to provide a secure connection between a web server application originating on a web server having a website domain name and a security device connected to the web server over a network via the host computer, the computer system comprising instructions implementing the method of claim 1.

15. The method for providing a secure connection of claim 1 wherein the connection key is linked to the authorizing organization by the authorizing organization digitally signing a portion of the connection key and wherein the connection key is linked to the digital certificate of the web server by the connection key including a fingerprint of the digital certificate of the web server.

16. method for providing a secure connection of claim 15 wherein the connection key comprises the signature of the authorizing organization of a portion of the connection key.

17. The method for providing a secure connection of claim 15 wherein the portion digitally signed by the authorizing organization includes at least one of organization name, common name, issuer name, and issue date and expiration date of the connection key.

18. A computer system having a host computer with a central processing unit, a memory, and a storage medium for storing instructions loadable into the memory and executable by the central processing unit, the storage medium including instructions for causing the central processing unit to provide a secure connection between a web server application originating on a web server having a website domain name and a security device connected to the web server over a network via the host computer, the computer system comprising instructions implementing the method of claim 1.

* * * * *